United States Patent
Rudyan

(10) Patent No.: US 11,427,983 B2
(45) Date of Patent: *Aug. 30, 2022

(54) BELOW GRADE, BLIND SIDE, IMPROVED DUAL WATERPROOFING MEMBRANE ASSEMBLY INCORPORATING A SHEET MEMBRANE WITH ADHESIVE TO FULLY BOND TO CONCRETE/SHOTCRETE, AND A METHOD OF MAKING, AND USING SAME

(71) Applicant: Amir Rudyan, Canoga Park, CA (US)

(72) Inventor: Amir Rudyan, Agoura Hills, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/222,692

(22) Filed: Apr. 5, 2021

(65) Prior Publication Data

US 2021/0222391 A1 Jul. 22, 2021

Related U.S. Application Data

(63) Continuation-in-part of application No. 16/408,679, filed on May 10, 2019, now Pat. No. 10,968,596.

(60) Provisional application No. 62/798,440, filed on Jan. 29, 2019.

(51) Int. Cl.
| | |
|---|---|
| *E02D 31/02* | (2006.01) |
| *E04B 1/66* | (2006.01) |
| *B32B 7/12* | (2006.01) |
| *B32B 11/04* | (2006.01) |

(52) U.S. Cl.
CPC .............. *E02D 31/025* (2013.01); *B32B 7/12* (2013.01); *B32B 11/046* (2013.01); *E04B 1/665* (2013.01); *B32B 2307/712* (2013.01); *B32B 2307/7265* (2013.01); *B32B 2419/04* (2013.01)

(58) Field of Classification Search
CPC ....... E02D 31/025; E02D 31/02; E02D 31/06; E02D 31/002; E02D 31/004; E04B 1/665
See application file for complete search history.

(56) References Cited

U.S. PATENT DOCUMENTS

| | | | | |
|---|---|---|---|---|
| 3,445,322 | A ‡ | 5/1969 | Saiia ........................ | E02D 31/02 428/178 |
| 3,725,185 | A ‡ | 4/1973 | Curtis ...................... | E02D 31/02 442/27 |
| 4,065,924 | A ‡ | 1/1978 | Young ..................... | E02B 3/126 405/270 |

(Continued)

*Primary Examiner* — Rodney Mintz
(74) *Attorney, Agent, or Firm* — Aziz M. Ahsan; Ahsan & Associates PLLC

(57) ABSTRACT

The present invention relates generally to an improved below grade, blind side, dual waterproofing membrane assembly incorporating a sheet membrane with adhesive to fully bond to concrete/shotcrete, and a method of making and using same. More particularly, the invention encompasses a dual membrane system that acts as a barrier, and prevents, and blocks water and moisture, from passing from one side of the structure to the other side. The innovative barrier layer system can be used along a wall, a floor, a ceiling, or along any structure which requires water or moisture proofing. The invention can be most effectively used between a concrete or shotcrete layer and the surrounding earth, such as, along an area that has a high water table or ground moisture or hydrostatic pressure that may creep into a foundation or a wall. The inventive system comprises two different waterproofing layers, and materials.

21 Claims, 5 Drawing Sheets

(56) References Cited

U.S. PATENT DOCUMENTS

| | | | | |
|---|---|---|---|---|
| 4,139,588 | A ‡ | 2/1979 | Clem | B32B 3/28 |
| | | | | 264/232 |
| 4,467,015 | A ‡ | 8/1984 | Clem | E04B 1/66 |
| | | | | 405/263 |
| 4,581,864 | A ‡ | 4/1986 | Shvakhman | C08K 3/346 |
| | | | | 106/DIG. 4 |
| 4,670,315 | A ‡ | 6/1987 | Hillemeier et al. | |
| | | | | B29C 37/0082 |
| | | | | 138/146 |
| 4,733,989 | A ‡ | 3/1988 | Harriett | C09D 5/34 |
| | | | | 405/43 |
| 4,810,573 | A ‡ | 3/1989 | Harriett | B32B 19/02 |
| | | | | 428/331 |
| 4,943,185 | A ‡ | 7/1990 | McGuckin | E02B 11/00 |
| | | | | 210/170.07 |
| 5,406,759 | A ‡ | 4/1995 | DeRosa | B32B 11/04 |
| | | | | 52/169.14 |
| 6,122,887 | A ‡ | 9/2000 | Massett | E02D 31/02 |
| | | | | 52/169.11 |
| 6,197,398 | B1 ‡ | 3/2001 | Mathieson | E02D 31/004 |
| | | | | 428/57 |
| 7,594,369 | B2 ‡ | 9/2009 | Kelly | E04D 3/405 |
| | | | | 52/300 |
| 7,698,858 | B2 ‡ | 4/2010 | Schroer | E04H 9/145 |
| | | | | 52/169.5 |
| 7,985,460 | B2 ‡ | 7/2011 | Polk | B32B 3/266 |
| | | | | 427/138 |
| 8,007,205 | B2 ‡ | 8/2011 | Marshall, III | B32B 27/12 |
| | | | | 405/229 |
| 8,454,773 | B2 ‡ | 6/2013 | Cisneros | E02D 31/02 |
| | | | | 156/272.4 |
| 8,720,145 | B2 ‡ | 5/2014 | Marshall, III | E02D 31/00 |
| | | | | 52/411 |
| 8,793,862 | B2 ‡ | 8/2014 | Weber | B32B 3/10 |
| | | | | 29/527.2 |
| 9,068,319 | B2 ‡ | 6/2015 | Troyer | E02D 17/00 |
| 9,228,341 | B2 ‡ | 1/2016 | Troyer | E02D 17/00 |
| 9,771,703 | B1 ‡ | 9/2017 | Golding, Jr. | B32B 5/022 |
| 10,358,588 | B2 ‡ | 7/2019 | Subotic | E04B 1/625 |
| 10,857,759 | B2 ‡ | 12/2020 | Humphreys | E04D 12/002 |
| 10,870,982 | B2 ‡ | 12/2020 | Rudyan | E04B 1/946 |
| 10,968,596 | B2 * | 4/2021 | Rudyan | B32B 7/08 |
| 11,142,880 | B2 * | 10/2021 | Rudyan | E02D 31/02 |
| 2003/0198521 | A1 ‡ | 10/2003 | Chandler, Jr. | B09B 1/004 |
| | | | | 405/270 |
| 2003/0233808 | A1 ‡ | 12/2003 | Zuppan | E04C 2/296 |
| | | | | 52/783.1 |
| 2007/0180791 | A1 ‡ | 8/2007 | Amster | E04F 13/04 |
| | | | | 52/741.3 |
| 2008/0245007 | A1 ‡ | 10/2008 | McDonald | E04C 2/284 |
| | | | | 52/309.5 |
| 2009/0056262 | A1 ‡ | 3/2009 | Kelly | E04D 13/1415 |
| | | | | 52/408 |
| 2009/0197042 | A1 ‡ | 8/2009 | Polk | B32B 27/32 |
| | | | | 428/137 |
| 2009/0257830 | A1 ‡ | 10/2009 | Marshall, III | B32B 27/12 |
| | | | | 405/270 |
| 2010/0173112 | A1 ‡ | 7/2010 | Wiercinski | B32B 5/024 |
| | | | | 428/41.8 |
| 2011/0197427 | A1 ‡ | 8/2011 | Weber | E02D 31/004 |
| | | | | 29/527.2 |
| 2015/0259902 | A1 ‡ | 9/2015 | Troyer | E04B 1/70 |
| | | | | 52/169.5 |
| 2016/0024782 | A1 ‡ | 1/2016 | Bess | B32B 5/00 |
| | | | | 428/41.5 |
| 2016/0303825 | A1 ‡ | 10/2016 | Humphreys | E04D 13/1675 |
| 2017/0356180 | A1 ‡ | 12/2017 | Lesire | B32B 7/14 |
| 2018/0290427 | A1 ‡ | 10/2018 | Humphreys | E04B 1/665 |
| 2019/0271168 | A1 * | 9/2019 | Clark | B32B 15/085 |
| 2020/0141112 | A1 ‡ | 5/2020 | Rudyan | B32B 11/08 |
| 2020/0240101 | A1 * | 7/2020 | Rudyan | B32B 27/08 |
| 2020/0370268 | A1 ‡ | 11/2020 | Rudyan | E02D 31/025 |

\* cited by examiner

‡ imported from a related application

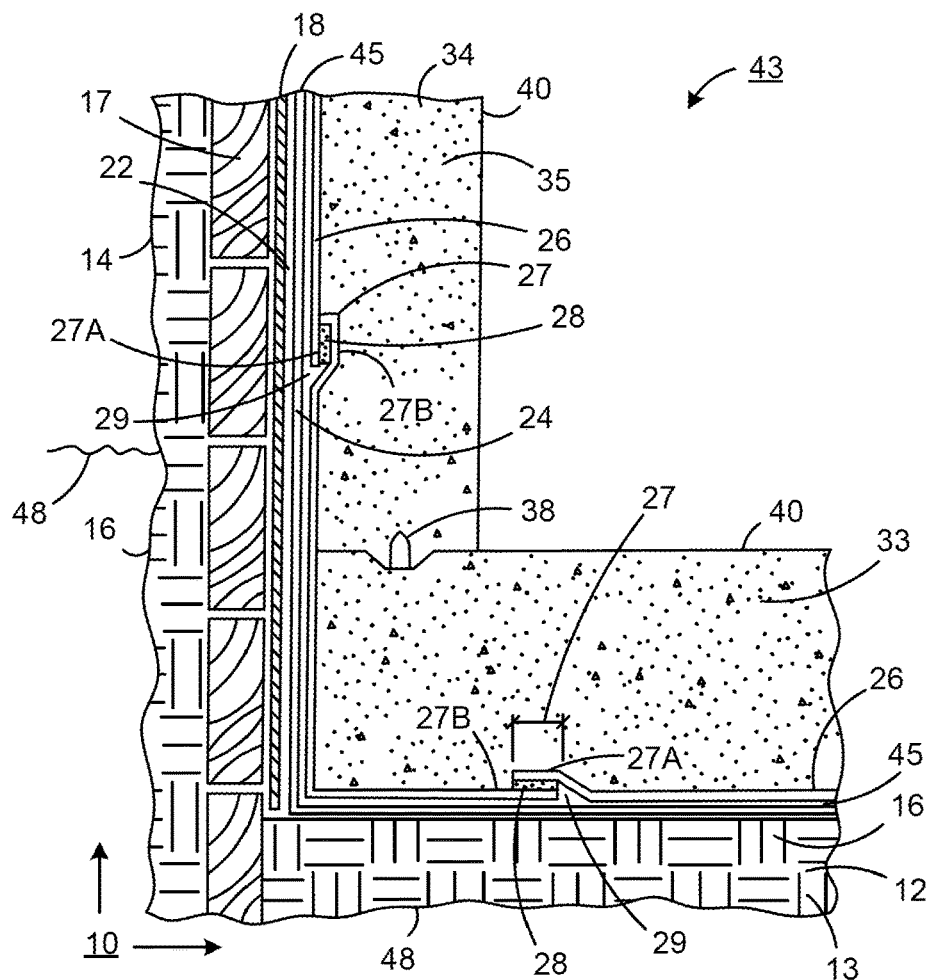
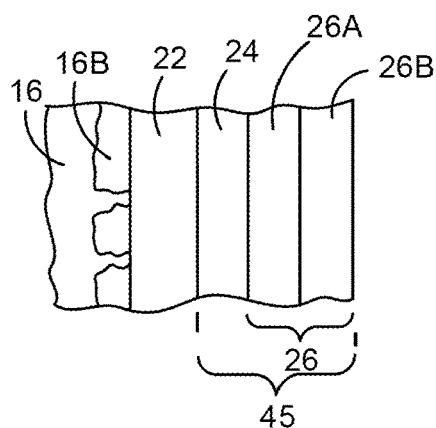 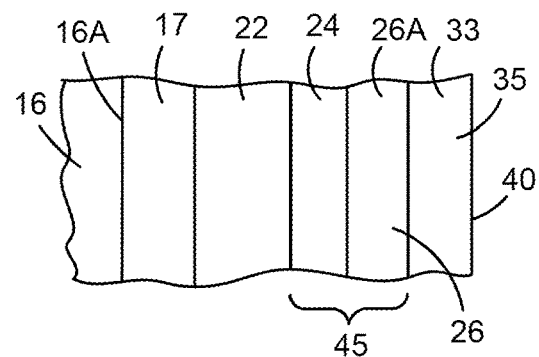
FIG.3
FIG.4   FIG.5

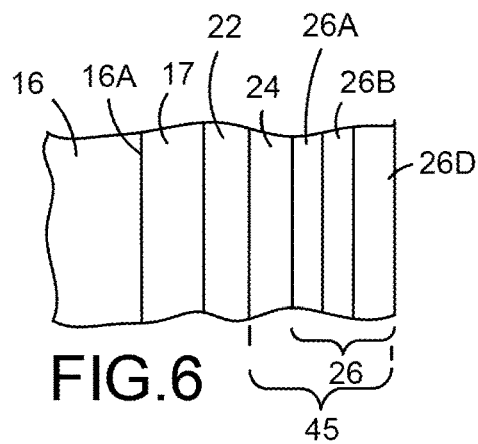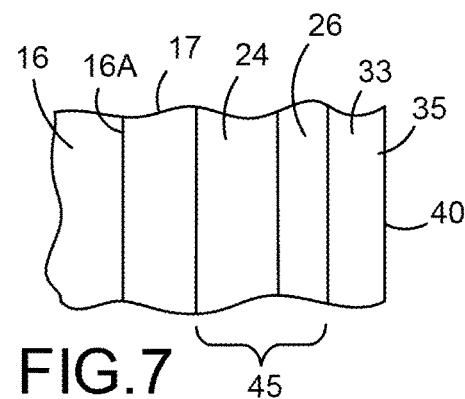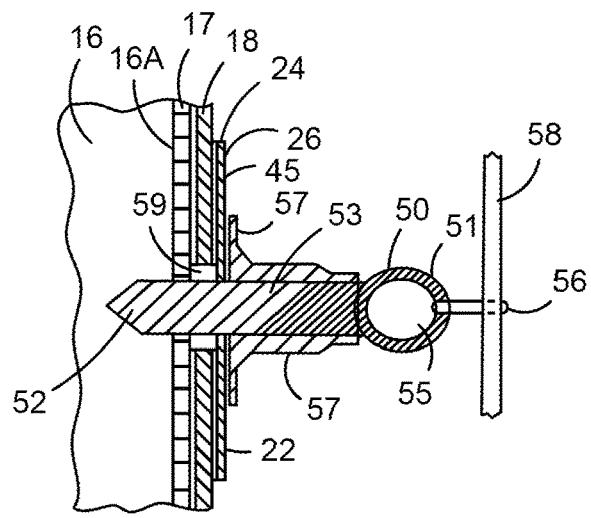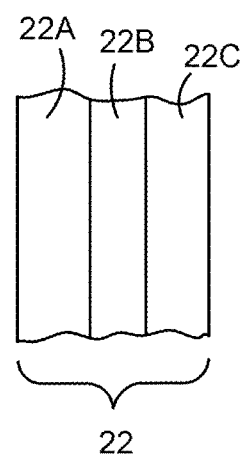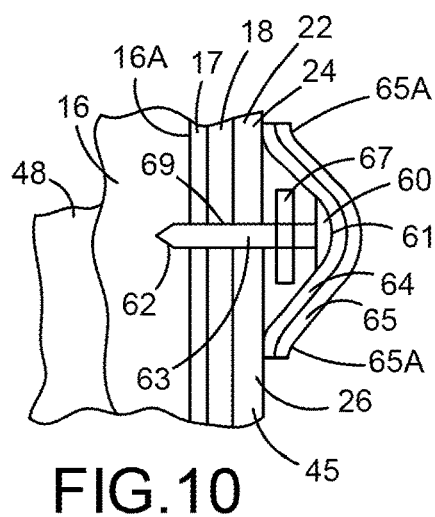

BELOW GRADE, BLIND SIDE, IMPROVED DUAL WATERPROOFING MEMBRANE ASSEMBLY INCORPORATING A SHEET MEMBRANE WITH ADHESIVE TO FULLY BOND TO CONCRETE/SHOTCRETE, AND A METHOD OF MAKING, AND USING SAME

CROSS-REFERENCE TO RELATED APPLICATIONS

The instant Patent Application is a Continuation-In-Part of U.S. Non-Provisional patent application Ser. No. 16/408,679, filed on May 10, 2019, titled "Below Grade, Blind Side, Dual Waterproofing Membrane Assembly Incorporating A Sheet Membrane With Adhesive To Fully Bond To Concrete/Shotcrete, And A Method Of Making, And Using Same,", and which Issued as U.S. Pat. No. 10,968,596, on Apr. 6, 2021, and which patent application claimed priority to and the benefit of U.S. Provisional Patent Application Ser. No. 62/798,440, filed on Jan. 29, 2019, titled "Below Grade, Blind Side, Dual Waterproofing Membrane Assembly Incorporating A Sheet Membrane With Adhesive To Fully Bond To Concrete/Shotcrete, And A Method Of Making And Using Same," the entire disclosure of each application is incorporated herein by reference.

FIELD OF THE INVENTION

The present invention relates generally to an improved below grade, blind side, dual waterproofing membrane assembly incorporating a sheet membrane with adhesive to fully bond to concrete/shotcrete, having at least one primary membrane, and at least one secondary liquid applied membrane that may consist of bitumen, rubber, polyurethane, asphalt, gel, or similar type liquid membrane material, or at least one secondary solid or sheet based membrane such as a bituminous, polyurethane, asphaltic or other similar type of sheet or solid waterproofing membrane, and a method of making, and using same. More particularly, the invention encompasses a dual layer or dual membrane system that acts as a barrier, and prevents, and blocks water and moisture, from passing from one side of the structure to the other side. The innovative barrier layer system can be used along a wall, a floor, a ceiling, or along any structure which requires water or moisture proofing. The invention can be most effectively used between a concrete or shotcrete layer and the surrounding earth, such as, along an area that has a high water table, or a constant hydrostatic pressure, or high ground moisture, that may creep into a foundation or a wall.

BACKGROUND INFORMATION

Water or moisture penetration into a structure has have been known in the water proofing industry for many years, and the water proofing industry has addressed this well-known problem in a variety of ways.

U.S. Pat. No. 4,139,588 (Arthur G. Clem) describes a panel which is provided forming a water barrier and comprising two opposing spaced sheets having between said spaced sheets a sealant composition comprising bentonite; a water soluble dispersing agent selected from the group consisting of a water-soluble salt of acetic acid, a water-soluble salt of phosphoric acid, and a water-soluble salt of boric acid; and a water-soluble polymer selected from the group consisting of polyacrylic acid, water-soluble salts of polyacrylic acid, hydrolyzed polyacrylonitrile, polyvinyl acetate, polyvinyl alcohol, copolymers of the foregoing, and a copolymer of acrylic acid and maleic anhydride, the amount of water-soluble polymer in said sealant composition being from 0.1% to 3.0%, by weight, and the amount of water-soluble dispersant in said sealant composition being from 0.1% to 3.0%, by weight, the weight ratio of water-soluble dispersant to water-soluble polymer being from 6:1-36. The panel is disposed against a foundation to act as a water barrier, shielding the foundation against water seepage.

U.S. Pat. No. 4,943,185 (James P. McGuckin, et al.) describes a combination drainage and waterproofing system for subterranean walls includes panels which have drain passages on the side thereof adjacent the soil. The front surface of each panel screens against soil entering the passages and the opposite surface of each panel is waterproof and is disposed in waterproof engagement with the waterproof surfaces of adjacent panels. A variety of panel constructions are disclosed. Several modes for providing the screening surfaces and the waterproof surfaces are also disclosed.

US Patent Publication No. 2007/0180791 (Daniel S. Amster) describes a draining apparatus and method for use in the construction of buildings having a stucco interior. The apparatus has a drain section and a screen coupled thereto. The drain section consists of a series of channels formed by a plurality of knobs, which in one embodiment may be formed into a plurality of aligned columns. The apparatus is coupled to a building foundation, at a level where it can facilitate positive drainage of water that has migrated downward through the stucco.

US Patent Publication No. 2010/0173112 (Wiercinski) describes a waterproofing membrane that, in its most basic form, includes three layers—a flexible substrate layer, a pressure sensitive adhesive layer and a release liner layer. The flexible substrate comprises a woven polyolefin mesh coated on each surface with a polymer film. The polyolefin mesh includes a first plurality of polyolefin tapes extending in a major direction interwoven with a second plurality of polyolefin tapes extending in a cross direction.

US Patent Publication No. 2011/0197427 (Weber) describes a sealant which is arranged in a meshlike manner between a composite layer and a barrier layer in a watertight membrane that includes a barrier layer and a composite layer. In the case of a leak in the barrier layer, the network of sealant between the composite layer and the barrier layer prevents the barrier layer from being affected. As a result, the size of the areas affected by penetrating water is limited. The damage by the penetrating water is thus limited to a smaller area, and the point of damage can thus be more easily localized.

However, this invention improves on the deficiencies of the prior art and provides an inventive improved below grade, blind side, dual waterproofing membrane assembly incorporating a sheet membrane with adhesive to fully bond to concrete/shotcrete, having at least one primary membrane, and at least one secondary membrane, and a method of making, and using same.

PURPOSES AND SUMMARY OF THE INVENTION

The invention is a novel improved below grade, blind side, dual waterproofing membrane assembly incorporating a sheet membrane with adhesive to fully bond to concrete/shotcrete, and a method of making, and using same.

Therefore, one purpose of this invention is to provide a novel improved below grade, blind side, dual waterproofing membrane assembly incorporating a sheet membrane with adhesive to fully bond to concrete/shotcrete, having at least one primary membrane, and at least one secondary membrane, and a method of making, and using same.

Another purpose of this invention is to provide a dual layer system that acts as a barrier, and prevents, and blocks water and moisture, from passing from one side of a structure to the other side.

Yet another purpose of this invention is to provide an innovative barrier layer system that can be used fully or partially along a wall, a floor, a ceiling, or along any structure which requires water or moisture proofing.

Still yet another purpose of this invention is to provide a waterproof barrier layer for a concrete or shotcrete layer.

Therefore, in one aspect this invention comprises a dual waterproofing membrane assembly system for a building, comprising:
(a) at least one soil retention system having a first face and a second face, and wherein said first face faces compacted earth or soil;
(b) at least one first waterproof membrane having a first face and a second face, and wherein at least a portion of said first face of said at least one first waterproof membrane is secured to at least a portion of said second face of said at least one soil retention system, and said at least one first waterproof membrane is composed of a layer of a first material;
(c) at least one second waterproof membrane having a first face and a second face, said at least one second waterproof membrane defining at least one waterproof skin membrane composed of a layer of a second material, and wherein at least a portion of said first face of said at least one waterproof skin membrane is secured to at least a portion of said second face of said at least one first waterproof membrane;
(d) at least one layer of one of concrete and shotcrete having a first face and a second face, and wherein at least a portion of said first face of said at least one layer of one of concrete and shotcrete is secured to at least a portion of said second face of said at least one waterproof skin membrane, so as to form said waterproofing membrane assembly system for said building;
(e) wherein the first material is different than the second material;
(f) wherein said at least one first waterproof membrane, and said at least one second waterproof membrane forming a dual waterproofing layer extends along a wall; and
(g) wherein one of said at least one first waterproof membrane, and said at least one second waterproof membrane extends along at least a portion of a floor.

In another aspect this invention comprises a dual waterproofing membrane assembly system for a building, comprising:
(a) at least one soil retention system having a first face and a second face, and wherein said first face faces compacted earth or soil;
(b) at least one liner having a first face and a second face, and wherein at least a portion of said first face of said at least one liner is secured to at least a portion of said second face of said at least one soil retention system;
(c) at least one first waterproof membrane having a first face and a second face, and wherein at least a portion of said first face of said at least one first waterproof membrane is secured to at least a portion of said second face of said at least one liner, and said at least one first waterproof membrane is composed of a layer of a first material;
(d) at least one second waterproof membrane having a first face and a second face, said at least one second waterproof membrane defining at least one waterproof skin membrane composed of a layer of a second material, and wherein at least a portion of said first face of said at least one waterproof skin membrane is secured to at least a portion of said second face of said at least one first waterproof membrane;
(e) at least one layer of one of concrete and shotcrete having a first face and a second face, and wherein at least a portion of said first face of said at least one layer of one of concrete and shotcrete is secured to at least a portion of said second face of said at least one waterproof skin membrane, so as to form a dual waterproofing membrane assembly system for said building;
(f) wherein the first material is different than the second material;
(g) wherein said at least one first waterproof membrane, and said at least one second waterproof membrane forming a dual waterproofing layer extends along a wall; and
(h) wherein one of said at least one first waterproof membrane, and said at least one second waterproof membrane extends along at least a portion of a floor.

In yet another aspect this invention comprises a method of providing a dual waterproofing membrane assembly system for a building, comprising the steps of:
(a) forming at least one soil retention system having a first face and a second face, and wherein said first face faces compacted earth or soil;
(b) securing at least one first waterproof membrane having a first face and a second face to at least a portion of said at least one soil retention system, such that said first face of said at least one first waterproof membrane is secured to at least a portion of said second face of said at least one soil retention system, and said at least one first waterproof membrane is composed of a layer of a first material;
(c) securing at least one second waterproof membrane having a first face and a second face, said at least one second waterproof membrane defining at least one waterproof skin membrane composed of a layer of a second material, to at least a portion of said at least one first waterproof membrane, such that said first face of said at least one waterproof skin membrane is secured to at least a portion of said second face of said at least one first waterproof membrane;
(d) securing at least one layer of one of concrete and shotcrete having a first face and a second face to at least a portion of said second face of said at least one waterproof skin membrane, so as to form a dual waterproofing membrane assembly system for said building;
(e) wherein the first material is different than the second material;
(f) wherein said at least one first waterproof membrane, and said at least one second waterproof membrane forming a dual waterproofing layer extends along a wall; and
(g) wherein one of said at least one first waterproof membrane, and said at least one second waterproof membrane extends along at least a portion of a floor.

BRIEF DESCRIPTION OF THE DRAWINGS

FIG. 3, illustrates a side cut-away view of the inventive below grade dual membrane waterproofing system for waterproofing according to a third embodiment of the invention.

FIG. 4, illustrates an enlarged side cut-away view of the inventive below grade dual membrane waterproofing system for waterproofing before the application of concrete or shotcrete, according to a fourth embodiment of the invention.

FIG. 5, illustrates an enlarged side cut-away view of the inventive below grade dual membrane waterproofing system for waterproofing after the application of concrete or shotcrete, according to a fifth embodiment of the invention.

FIG. 6, illustrates an enlarged side cut-away view of the inventive below grade dual membrane waterproofing system for waterproofing before the application of concrete or shotcrete, according to a sixth embodiment of the invention.

FIG. 7, illustrates an enlarged side cut-away view of the inventive below grade dual membrane waterproofing system for waterproofing after the application of concrete or shotcrete, according to a seventh embodiment of the invention.

FIG. 8, illustrates an enlarged side cut-away view of the inventive below grade dual membrane waterproofing system for waterproofing before the application of concrete or shotcrete, according to an eighth embodiment of the invention.

FIG. 9, illustrates an enlarged side cut-away view of the inventive below grade dual membrane waterproofing system for waterproofing before the application of concrete or shotcrete, according to a ninth embodiment of the invention.

FIG. 10, illustrates an enlarged side cut-away view of the inventive below grade dual membrane waterproofing system for waterproofing before the application of concrete or shotcrete, according to a tenth embodiment of the invention.

DETAILED DESCRIPTION

Figure 1:
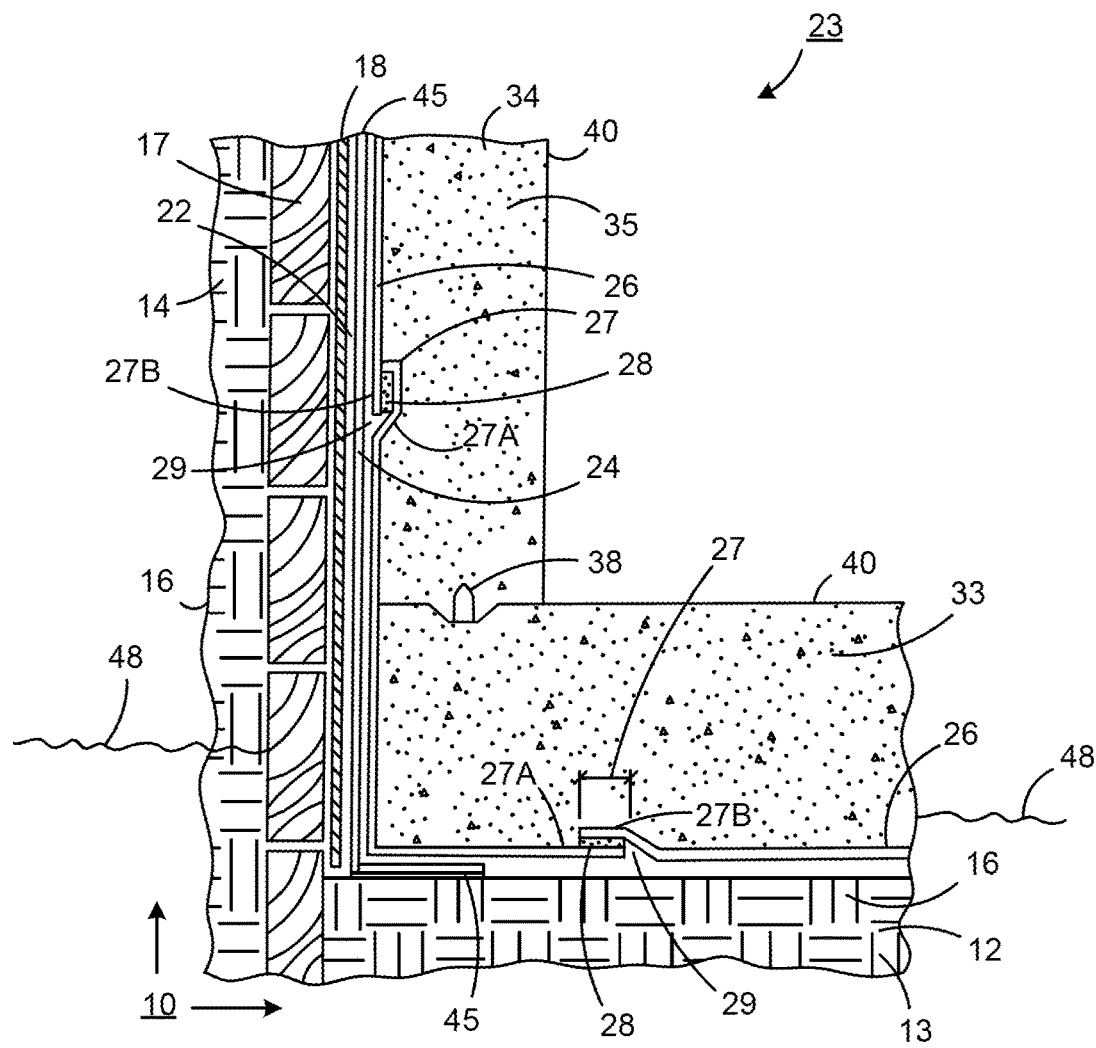
FIG. 1, illustrates a side cut-away view of the inventive below grade dual membrane waterproofing system for waterproofing according to a first embodiment of the invention.

The inventive improved below grade, blind side, dual waterproofing membrane assembly incorporating a sheet membrane with adhesive to fully bond to concrete/shotcrete, having at least one primary membrane, and at least one secondary membrane, and a method of making, and using same will now be discussed with reference to FIGS. 1 through 13. Although the scope of the present invention is much broader than any particular embodiment, a detailed description of the preferred embodiment follows together with drawings. These drawings are for illustration purposes only and are not drawn to scale. Like numbers represent like features and components in the drawings.

In summary the invention is an improved below grade dual membrane waterproofing system, and a method of making, and using same, and more particularly directed to an improved below grade, blind side, dual waterproofing membrane assembly incorporating at least one sheet membrane with adhesive to fully bond to concrete/shotcrete, having at least one primary membrane, and at least one secondary membrane, and a method of making, and using same in building or wall construction, and placing it under and around a foundation of a building or dwelling or on its below grade blind side retaining walls, etc.

FIG. 1, illustrates a side cut-away view of the inventive below grade dual membrane waterproofing system for waterproofing 23, according to a first embodiment of the invention. After an area 10, has been dug up or prepared for the foundation of a building 34, or floor 12, or a wall 14, or a structure 12, 14, it is recommended that the floor areas 13, either be compacted, to form a compacted earth 16, or that a mud slab 16, be installed, so as to create a substantially flat horizontal or floor surface 13. It is also recommended that similar steps are also taken for the preparation of a side wall 14, or similar other structure 12, 14, so that one gets compacted earth 16, or concrete type surface 16, creating a substantially flat vertical wall surface 14. For some applications, such as, for example, a blind side wall 14, a soil retention system 17, may be needed to be installed, such as, for example, using wood lagging 17, a soil cement 17, a metal wire mesh embedded in concrete 17, to name a few. It should be appreciated that a soil retention system 17, helps in holding back the compacted earth or dirt 16, from coming down due to, for example, gravity. The soil retention system 17, also helps in creating a substantially uniform vertical wall surface 14. For some applications one could also place at least one layer of drain board 18, (such as, for example, AVM Drain Board 6000) or foam 18, along the face of the open soil retention system 17, or along the face of the open compacted earth 16. The next step is to apply or secure at least one layer of a strong plastic liner 22, such as, a polyolefin liner 22, against the open face of the wall 14, or drain board 18, or foam 18, (if used) or over the compacted earth 16, or concrete surface 16, or waist slab 16, or mud slab 16, or soil retention system 17. The plastic liner 22, usually comes in sheets 22, or rolls 22, which are then hung onto the exposed wall surface 14, using at least one securing means 50, 60, such as, nails, screws, bolt, anchor, adhesive material, and combinations thereof, to name a few. Similarly, when needed, the plastic liner 22, may also be laid down along the exposed floor surface 13. It should be understood that a small portion of the edges of the plastic liner 22, is overlapped along the edges of the plastic liner 22, for each surface, so as to create an illusion of a continuous layer of the plastic liner 22, along the whole surface, be it the wall 14, or the floor 13. The next step is to apply at least one layer of a membrane 24, (such as, for example, an Aussie Membrane 500/502), which is also referred to as a secondary membrane 24, covering the open or exposed face area of the plastic liner 22. The membrane 24, can be a solid sheet membrane 24, or a solid membrane roll 24, or it could be a liquid membrane 24, which is applied as a liquid 24, but upon curing becomes a solid sheet 24, or a layer membrane 24. If the membrane 24, is applied as a liquid then it will automatically stick to the exposed surface of the plastic liner 22, however, if the membrane 24, is a solid sheet or roll membrane 24, then it will be loosely laid over the plastic liner 22, and if needed, it will be secured to the substructure 16, 17, and/or 18, with at least one securing means 50, 60, to secure the membrane 24, to the substructure 16, 17, and/or 18, and where the at least one securing means 50, 60, could be selected from a group comprising, nails, screws, bolt, anchor, adhesive material, and combinations thereof, to name a few. The next step is to apply at least one skin layer 26, (such as, for example, Aussie Skin 550), which is also referred to as a primary membrane 26, over the open or exposed face or surface of the secondary membrane layer 24. For areas where there needs to be an overlap 27, for example, between one first edge 27A, of the first skin layer 26, and a second edge 27B, of a second skin layer 26, as there is a seam 29, one can apply, at least one securing means 28, such as, for example, a double sided tape 28, (such as, for example, an Aussie Skin Double Sided tape), so as to secure the first edge 27A, of the first skin layer 26, to the second edge 27B, of the second skin layer 26, and this will create a continuous skin layer 26, along the surface 14, 13, such as, the wall 14, or floor 13. The next step is to create a concrete slab 33, 35, or barrier 33, 35, for the foundation of the structure 34, or wall 14, or floor 12, or building 34, such as, for example, a concrete or shotcrete slab or floor 33, and/or a concrete or shotcrete wall 35. The dual membrane waterproofing system 23, prevents the water 48, or moisture 48, from penetrating into the concrete floor 33 or concrete/shotcrete wall 34, from around a water table 48, or moisture 48, or hydrostatic pressure 48. The dual membrane waterproofing system 45, comprises essentially of a primary membrane 26, and a secondary membrane 24, forming the dual membrane system 45, and thus one has two separate waterproofing membranes 24, and 26, which allows for a waterproofing of the area or regions that needs waterproofing or moisture proofing, as the plastic layer 22, provides the puncture resistance, while the membrane layers 24 and 26, provides the needed water or moisture proofing, especially, in situations where concrete 33, 35, or shotcrete 33, 35, is used. It should be appreciated that the combination of two separate waterproofing membranes 24, 26, one of which is a sheet membrane 26, with adhesive 26A, to fully bond to concrete/shotcrete 33, 35, form the inventive dual membrane system 45. For some applications, one could also provide the wall 14, floor 12, joining location with at least one waterstop 38, (such as, for example, an Aussie swell water-stop). It should be appreciated that the plastic liner 22, serves several purposes, such as, for example, it adds "burst resistance", it acts as a backing layer onto which one sprays the liquid bituminous membrane 24, to name a few.

Figure 2:
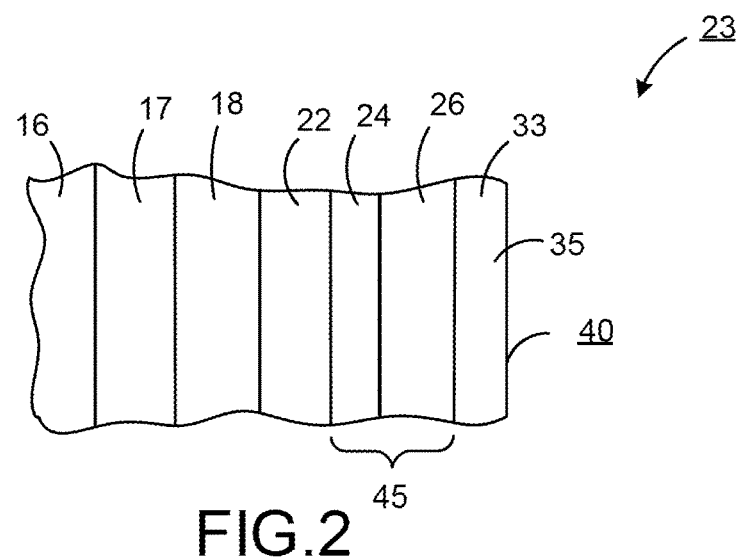
FIG. 2, illustrates an enlarged side cut-away view of the inventive below grade dual membrane waterproofing system for waterproofing according to a second embodiment of the invention.

FIG. 2, illustrates an enlarged side cut-away view of the inventive below grade dual membrane waterproofing system for waterproofing 23, according to a second embodiment of the invention. As one can see that at least one layer of a soil retention system 17, is applied against compacted earth 16. At least one drain board or foam 18, if needed, is then secured to the exposed face of the soil retention system 17. In the next step at least one layer of a plastic layer or sheet 22, such as, a polyolefin layer or sheet 22, is secured or adhered to the drain board or foam 18, or to the soil retention system 17. At least one layer of a membrane 24, such as, a liquid membrane 24, consisting of bitumen, rubber, polyurethane, asphalt, gel, or similar type liquid membrane material or a sheet-based membrane 24, such as a bituminous, polyurethane, asphaltic or other similar type of sheet waterproofing membrane 24, is then used to completely coat or cover the exposed face of the plastic layer or sheet 22. A layer consisting of a sheet membrane 26, with adhesive 26A, (such as, for example, Aussie Skin 550), to fully bond to concrete/shotcrete, 33, 35, is then applied and secured to the cured layer of the bitumen layer 24, or membrane layer 24. Thus, the dual waterproofing membrane assembly 45, comprising of at least one secondary membrane 24, and at least one primary membrane 26, provides an innovative water protection or proofing system or barrier, and now a concrete wall 35, or floor 33, can be formed over the exposed face or surface of the dual membrane layer 45, such that the exposed side 40, of the concrete wall 35, or floor 33, forms the interior wall 40, or the exterior wall 40, or interior floor 40, or exterior floor 40, of the structure or building 34.

FIG. 3, illustrates a side cut-away view of the inventive below grade dual membrane waterproofing system for waterproofing 43, according to a third embodiment of the invention. FIG. 3, is similar to FIG. 1, except the dual inventive layer assembly 45, is extended along all surfaces that need water or moisture protection, from the water table 48, or hydrostatic pressure 48, such as, side wall 14, and the entire floor area 13, etc. Furthermore, FIG. 3, also shows that for some applications or areas, one may not need a drain board or foam 18, while in other areas, a drain board or foam 18, may be needed or desired.

FIG. 4, illustrates an enlarged side cut-away view of the inventive below grade dual membrane waterproofing system for waterproofing 23, 43, before the application of concrete 33, 35, or shotcrete 33, 35, according to a fourth embodiment of the invention. The dirt or earth 16, has at least one layer of at least one plastic liner 22, to which is secured at least one layer of at least one membrane 24. A skin or primary layer 26, consisting of a sheet membrane 26, with adhesive 26A, to fully bond to concrete/shotcrete 33, 35. The skin or primary layer 26, consists of at least one layer of an adhesive 26A, and at least one layer of a bonding material 26B, such as, sand 26B, is then installed over/secured to the secondary membrane, 24. As one can see that the dirt or earth 16, has not been compacted, and thus gaps, voids or spaces 16B, have appeared, which could allow a single membrane system to rupture into these gaps or voids 16B, during concrete or shot-crete 33, 35, applications and create moisture leaks. These moisture leaks could create many problems including a weakness in the final structure 12, 14, 34, that is formed, putting the entire structure 12, 14, 34, at risk. These are serious risks necessitating the dual membrane assembly 45, to prevent the membrane 22, from rupturing during concrete or shot-crete 33, 35, applications. Therefore, if the problem of voids or gaps 16B, are not addressed then these problems will permeate throughout the structure as additional layers are formed, and these gaps or spaces 16B, could potentially create a weakness in the final structure 12, 14, 34, that is formed, however, the inventive dual membrane assembly 45, addresses this concern, and substantially reduces the potential rupturing or cracking of the liner layer 22, especially during the application of concrete 33, 35, or shotcrete 33, 35.

FIG. 5, illustrates an enlarged side cut-away view of the inventive below grade dual membrane waterproofing system for waterproofing 23, 43, after the application of concrete 33, 35, or shotcrete 33, 35, according to a fifth embodiment of the invention. The dirt or earth 16, is compacted so as to form a substantially vertical or horizontal surface 16A, and which is substantially free from voids 16B. At least one layer of at least one plastic liner 22, is then secured to the exposed face or surface of the compacted surface 16A, of the earth or dirt 16, or soil retention system 17. The exposed face or surface of the at least one plastic liner 22, is then covered with at least one layer of at least one membrane 24, or secondary membrane 24. A primary membrane 26, or a skin layer 26, consisting of a sheet membrane 26, with at least one adhesive 26A, at least one protection material 26B, such as, sand 26B, or a coating 26B, to fully bond to concrete/shotcrete, 33, is then secured to the open face of the secondary membrane 24. At least one layer of concrete 33, 35, or shotcrete 33, 35, is then applied to the exposed face or surface of the sheet membrane 26, and wherein the concrete 33, 35, or shotcrete 33, 35, layer chemically bonds to the exposed face of the sheet membrane 26, so that the concrete 33, 35, or shotcrete 33, 35, is now permanently, and chemically bonded to the primary membrane layer 26.

FIG. 6, illustrates an enlarged side cut-away view of the inventive below grade dual membrane waterproofing system for waterproofing 23, 43, before the application of concrete or shotcrete 33, 35, according to a sixth embodiment of the invention. As one can see that the dirt or earth 16, has been compacted, and thus gaps, voids or spaces 16B, do not appear, which leaves a substantially flat or smooth surface 16A, for the application of the next layer, such as, a retention layer 17. For this application the dirt or earth 16, has a soil retention system 17, and to which at least one layer of at least one plastic liner 22, is secured. At least one layer of at least one liner or secondary membrane 24, is then secured to the exposed face or surface of the plastic liner 22. A skin or primary layer 26, consisting of a sheet membrane 26, with adhesive 26A, to fully bond to concrete/shotcrete 33, 35, is then secured to the exposed face or surface of the secondary membrane 24. For this application the skin or primary layer 26, consists of at least one layer of an adhesive 26A, and at least one layer of a protection material 26B, such as, sand 26B, or a coating 26B, and at least one layer of coating 26D, or a sand layer 26D, or a mineral layer 26D, which is then installed over or secured to the exposed surface or face of the secondary membrane, 24. Concrete 33, 35, or shotcrete 33, 35, can now be applied to the exposed face or surface of the coating layer 26B.

FIG. 7, illustrates an enlarged side cut-away view of the inventive below grade dual membrane waterproofing system for waterproofing 23, 43, after the application of concrete 33, 35, or shotcrete 33, 35, according to a seventh embodiment of the invention. As one can see that the dirt or earth 16, has been compacted, and thus gaps, voids or spaces 16B, do not appear, which leaves a substantially flat or smooth surface 16A, for the application of the next layer, such as, a retention layer 17. For this application the dirt or earth 16, has a soil retention system 17, and to which at least one layer of at least one liner or secondary membrane 24, is then secured to the exposed face or surface of the soil retention system 17. A skin or primary layer 26, consisting of a sheet membrane 26, with adhesive 26A, to fully bond to concrete/shotcrete 33, 35, is then secured to the exposed face or surface of the secondary membrane 24. At least one layer of concrete 33, 35, or shotcrete 33, 35, is then applied to the exposed face or surface of the primary membrane layer 26.

FIG. 8, illustrates an enlarged side cut-away view of the inventive below grade dual membrane waterproofing system for waterproofing 23, 43, before the application of concrete 33, 35, or shotcrete 33, 35, according to an eighth embodiment of the invention. For some applications one has to secure the drain board 18, or foam board 18, and/or the plastic layer 22, and/or the secondary layer or membrane 24, and/or the primary layer or membrane 26, or a rebar cage 58, to either the earth or mud slab 16, and/or the soil retention system 17, and for such securing one could use at least one securing means or device 50, such as, for example, a screw 50, an anchor 50, a nail 50, an adhesive 50, a bolt 50, and combinations thereof, to name a few. The securing means 50, typically has a head 51, a tail end 52, and a shaft 53. For some applications the head 51, could have at least one opening or eyelet 55. After the shaft 53, of the securing means 50, has penetrated the various layers 16, 17, 18, 22, 24, 26, 45, and the tail end 52, has been anchored to the earth or mud slab 16, and/or the soil retention system 17, one would then use at least one sealant 57, around the opening 59, created by the penetration of the shaft 53, through the various layers 16, 17, 18, 22, 24, 26, 45, so as to create a moisture or fluid barrier layer. For some applications one could also place the at least one sealant 57, on or around the shaft 53, of the at least one securing means or device 50. Therefore, once the rebar cage 58, has been properly secured one can then apply at least one layer of concrete 33, 35, or shotcrete 33, 35, to the exposed face or surface of the final layer 45. It should be appreciated that for most applications the securing means 50, usually gets buried in the at least one layer of concrete 33, 35, or shotcrete 33, 35. For some applications a securing means 56, such as, a tie 56, a string 56, to name a few, can be used the secure the rebar cage 58, to the securing means 50, such as, by securing the securing means 56, using the eyelet 55, or the head 51, to secure the rebar cage 58, to the substructure 16, 17, 18, 22, 24, 26, 45, via the at least one securing means 50. It is preferred that the at least one sealant 57, is made from a material that has a long life, and does not disintegrate, such as, in a water or moisture or hydrostatic pressure environment 48. Similarly, it is preferred that the at least one securing means 50, is made from a material that is non-rusting, and that the securing means 50, has a long life, and does not disintegrate, such as, in a water or moisture or hydrostatic pressure environment 48.

FIG. 9, illustrates an enlarged side cut-away view of the inventive below grade dual membrane waterproofing system for waterproofing 23, 43, before the application of concrete 33, 35, or shotcrete 33, 35, according to a ninth embodiment of the invention. For some application the plastic liner 22, or polyolefin layer 22, may also include at least one layer of a fabric material 22A, 22C, that is secured or bonded to it, such as, a single layer 22A, and/or 22C, before the liquid bitumen material 24, is spray coated, or other solid membrane 24, is applied. So for a single layer system the plastic liner 22, could have at least one layer of a fabric material 22A, or 22C, on one side of the plastic liner 22B. However, for a dual layer system the plastic liner 22, would have at least one first layer of a fabric material 22A, on one side of the plastic liner 22B, and at least one second layer of a fabric material 22C, on the other or opposite side of the plastic liner 22B. The at least one liner 22, could be selected from a group comprising of a plastic liner 22, a polyolefin liner 22, a fabric liner 22, a single fabric liner 22, a dual fabric liner 22, a high-density polyethylene (HDPE) liner 22, a polyethylene high-density (PEHD) liner 22, a polyethylene thermoplastic liner 22, and combinations thereof, to name a few.

FIG. 10, illustrates an enlarged side cut-away view of the inventive below grade dual membrane waterproofing system for waterproofing 23, 43, before the application of concrete or shotcrete, according to a tenth embodiment of the invention. For some applications one has to secure the drain board 18, and/or the plastic layer 22, and the secondary layer or membrane 24, and the primary layer or membrane 26, or the dual membrane 45, to either the earth or mud slab 16, and/or the soil retention system 17, or each to the other, and for such securing one could use at least one securing means 60, or device 60, such as, for example, a screw 60, an anchor 60, a nail 60, an adhesive 60, a bolt 60, and combinations thereof, to name a few. The securing means 60, typically has a head 61, a tail end 62, and a shaft 63. After the shaft 63, of the securing means 60, has penetrated the various layers 16, 17, 18, 22, 24, 26, 45, and the tail end 62, has been anchored to the earth or mud slab 16, and/or the soil retention system 17, one would then use at least one optional sealant 67, or a washer 67, or a grommet 67, or an O-Ring 67, around the opening 69, created by the penetration of the shaft 67, through the various layers 16, 17, 18, 22, 24, 26, 45, so as to create a moisture or fluid barrier layer at a location opposite of the earth or mud slab 16, and near the head 61, of the securing means 60. For some applications the at least one sealant 67, or a washer 67, or a grommet 67, or an O-Ring 67, can be placed on or around the shaft 63, of the securing means 60, or device 60, and then the head 61, could be pushed towards the earth or mud slab 16, so that the at least one sealant 67, substantially covers the opening 69, which has been created by the penetration of the shaft 63, and that the at least one optional sealant 67, is tightly sandwiched between the head 61, and the adjacent surface layer 16, 17, 18, 22, 24, 26, 45. For some applications one could also place at least one patch 65, having peripheral edges 65A, such as, an Aussie skin patch 65, using at least one securing means 64, such as, for example, an adhesive 64, a double-sided tape 64, a sealant 64, and combinations thereof, to name a few, to provide an additional layer of protection from any fluid 48, or hydrostatic pressure 48, that might penetrate into the structure via the opening 69. It should be understood that the peripheral edges 65A, of the patch 65, gets adhered and secured to the exposed face of the substructure 22, 24, 26, 45, via the securing means 64. Therefore, once the securing device 60, has secured the substructure 16, 17, 18, 22, 24, 26, 45, one can then apply at least one layer of concrete 33, 35, or shotcrete 33, 35, to the exposed face or surface of the final layer 45. It should be appreciated that for most applications the securing means 60, gets buried in the at least one layer of concrete 33, 35, or shotcrete 33, 35. It is preferred that the at least one optional sealant 67, is made from a material that has a long life, and does not disintegrate, such as, in a water or moisture or hydrostatic pressure environment 48. Similarly, it is preferred that the at least one securing means 60, is made from a material that is non-rusting, and that the securing means 60, has a long life, and does not disintegrate, such as, in a water or moisture or hydrostatic pressure environment 48.

Figure 11:
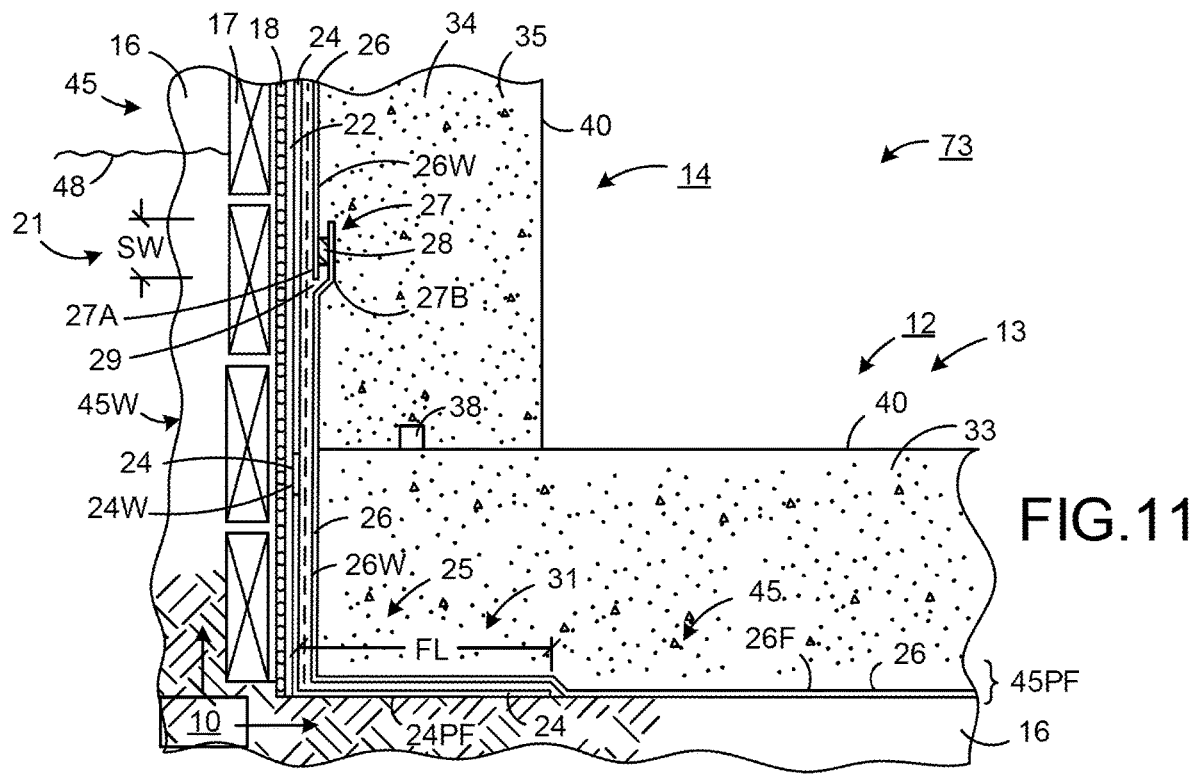
FIG. 11, illustrates a side cut-away view of the inventive below grade dual membrane waterproofing system for waterproofing according to an eleventh embodiment of the invention.

FIG. 11, illustrates a side cut-away view of the inventive below grade dual membrane waterproofing system for waterproofing 73, according to an eleventh embodiment of the invention. FIG. 11, is similar to FIG. 1, except that the dual inventive layer assembly 45, fully extends along the wall surface 14, creating a dual inventive wall layer assembly 45W, and it partially extends along the floor surface 12, 13, creating a dual inventive floor partial layer assembly 45PF, and the combination of 45W, and 45PF, is used as a water or moisture protection layer 45, or as a waterproofing layer 45, against the water table 48, or hydrostatic pressure 48. Furthermore, FIG. 11, also shows that for some applications or areas, one may not need a drain board or foam 18, while in other areas, a drain board or foam 18, may be needed or desired by a user, or as needed in a specific application. Thus, as one can appreciate that the dual inventive wall layer assembly 45W, comprises of at least one layer of the membrane 24, or at least one layer of a wall membrane 24W, that fully extends along the wall 14, and at least one skin layer 26, or at least one layer of a wall skin layer 26W, that fully extends along the wall 14. Similarly, the dual inventive floor layer assembly 45PF, comprises of at least one layer of the membrane 24, or at least one partial layer of a floor membrane 24PF, that partially extends along the floor 12, 13, and at least one skin layer 26, or at least one layer of a floor skin layer 26F, that fully extends along the floor 12, 13. It is preferred that the at least one partial layer of the floor membrane 24PF, that partially extends along the floor 12, 13, extends along the floor 12, or floor area 13, to at least a distance 31, or floor length FL. For most applications the distance 31, could be from about 6 inches, or about 12 inches, or at least a sufficient distance that it provides sufficient waterproofing capability to the dual inventive floor layer assembly 45PF. For most applications it is preferred that the dual inventive wall layer assembly 45W, transitions into the dual inventive floor layer assembly 45PF, at or around the corner 25, without a seam, such as, seam 29. For some applications it is preferred that the seam 29, has a seam width 21, or seam width SW, and wherein the seam width 21, is sufficiently wide to provide a waterproof seam 29. It is preferred for most applications that the seam width 21, is at least, say about 3 inches or more, or as desired by the user, or as needed for the application. Even though seam 29, provides a complete waterproof seam or joint 29, but in reality it does provide a weak spot, as it is done by hand by workers, and not some precise calibrated equipment or machine. It should be appreciated that the seam 29, is only shown for the at least one skin layer 26, but in reality the at least one layer of the membrane 24, also has seam 29, but for the ease of understanding it is not being shown. However, it should be understood that the seam 29, for the at least one layer of the membrane 24, is similar to the seam 29, for the at least one skin layer 26, and uses the same materials, and processes to create the seam 29, for the at least one layer of the membrane 24. Furthermore, it should be understood that for some applications as shown in FIG. 11, the inventive dual layer 45, comprising of the inventive wall portion dual layer 45W, and the inventive floor portion dual layer 45F, extends along at least a portion of the wall 14, and along at least a portion of the floor surface 12, 13. However, as shown in FIG. 11, the inventive floor portion dual layer 45PF, has the at least one layer of the floor skin layer 26F, extending along the entire surface of the floor 12, 13, while the at least one layer of the floor membrane 24PF, extends along only a portion of the floor 12, 13.

Figure 12:
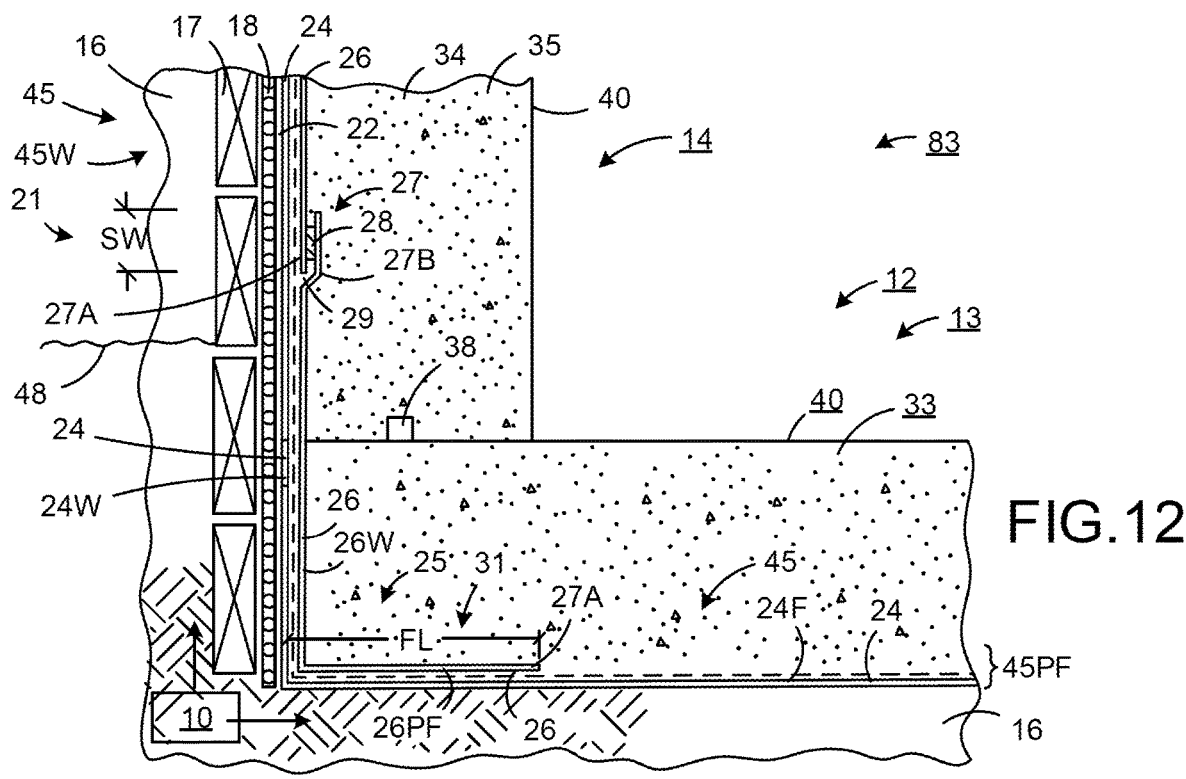
FIG. 12, illustrates a side cut-away view of the inventive below grade dual membrane waterproofing system for waterproofing according to a twelfth embodiment of the invention.

FIG. 12, illustrates a side cut-away view of the inventive below grade dual membrane waterproofing system for waterproofing 83, according to a twelfth embodiment of the invention. FIG. 12, is similar to FIG. 1, except that the dual inventive layer assembly 45, fully extends along the wall surface 14, creating a dual inventive wall layer assembly 45W, and it partially extends along the floor surface 12, 13, creating a dual inventive floor partial layer assembly 45PF, and the combination of 45W, and 45PF, is used as a water or moisture protection layer 45, or as a waterproofing layer 45, against the water table 48, or hydrostatic pressure 48. Furthermore, FIG. 12, also shows that for some applications or areas, one may not need a drain board or foam 18, while in other areas, a drain board or foam 18, may be needed or desired by a user, or as needed in a specific application. Thus, as one can appreciate that the dual inventive wall layer assembly 45W, comprises of at least one layer of the membrane 24, or at least one layer of a wall membrane 24W, that fully extends along the wall 14, and at least one skin layer 26, or at least one layer of a wall skin layer 26W, that fully extends along the wall 14. Similarly, the dual inventive partial floor layer assembly 45PF, comprises of at least one layer of the membrane 24, or at least one layer of a floor membrane 24F, that extends along the floor 12, 13, and at least one skin layer 26, or at least one partial floor skin layer 26PF, that partially extends along the floor 12, 13. It is preferred that the at least one partial floor skin layer 26PF, that partially extends along the floor 12, 13, extends along the floor 12, or floor area 13, to at least a distance 31, or floor length FL. For most applications the distance 31, could be from about 6 inches, or about 12 inches, or at least a sufficient distance that it provides sufficient waterproofing capability to the dual inventive partial floor layer assembly 45PF. For most applications it is preferred that the dual inventive wall layer assembly 45W, transitions into the dual inventive floor layer assembly 45PF, at or around the corner 25, without a seam, such as, seam 29. For some applications it is preferred that the seam 29, has a seam width 21, or seam width SW, and wherein the seam width 21, is sufficiently wide to provide a waterproof seam 29. It is preferred for most applications that the seam width 21, is at least, say about 3 inches or more, or as desired by the user, or as needed for the application. Even though seam 29, provides a complete waterproof seam or joint 29, but in reality it does provide a weak spot, as it is done by hand by workers, and not some precise calibrated equipment or machine. It should be appreciated that the seam 29, is only shown for the at least one skin layer 26, but in reality, the at least one layer of the membrane 24, also has seam 29, but for the ease of understanding it is not being shown. However, it should be understood that the seam 29, for the at least one layer of the membrane 24, is similar to the seam 29, for the at least one skin layer 26, and uses the same materials, and processes to create the seam 29, for the at least one layer of the membrane 24. Furthermore, it should be understood that for some applications as shown in FIG. 12, the inventive dual layer 45, comprising of the inventive wall portion dual layer 45W, and the inventive floor portion dual layer 45F, extends along at least a portion of the wall 14, and along at least a portion of the floor surface 12, 13. However, as shown in FIG. 12, the inventive floor portion dual layer 45PF, has the at least one layer of the floor skin layer 26PF, extending along only a portion of the floor 12, 13, while the at least one layer of the floor membrane 24F, extends along the entire surface of the floor 12, 13.

Figure 13:
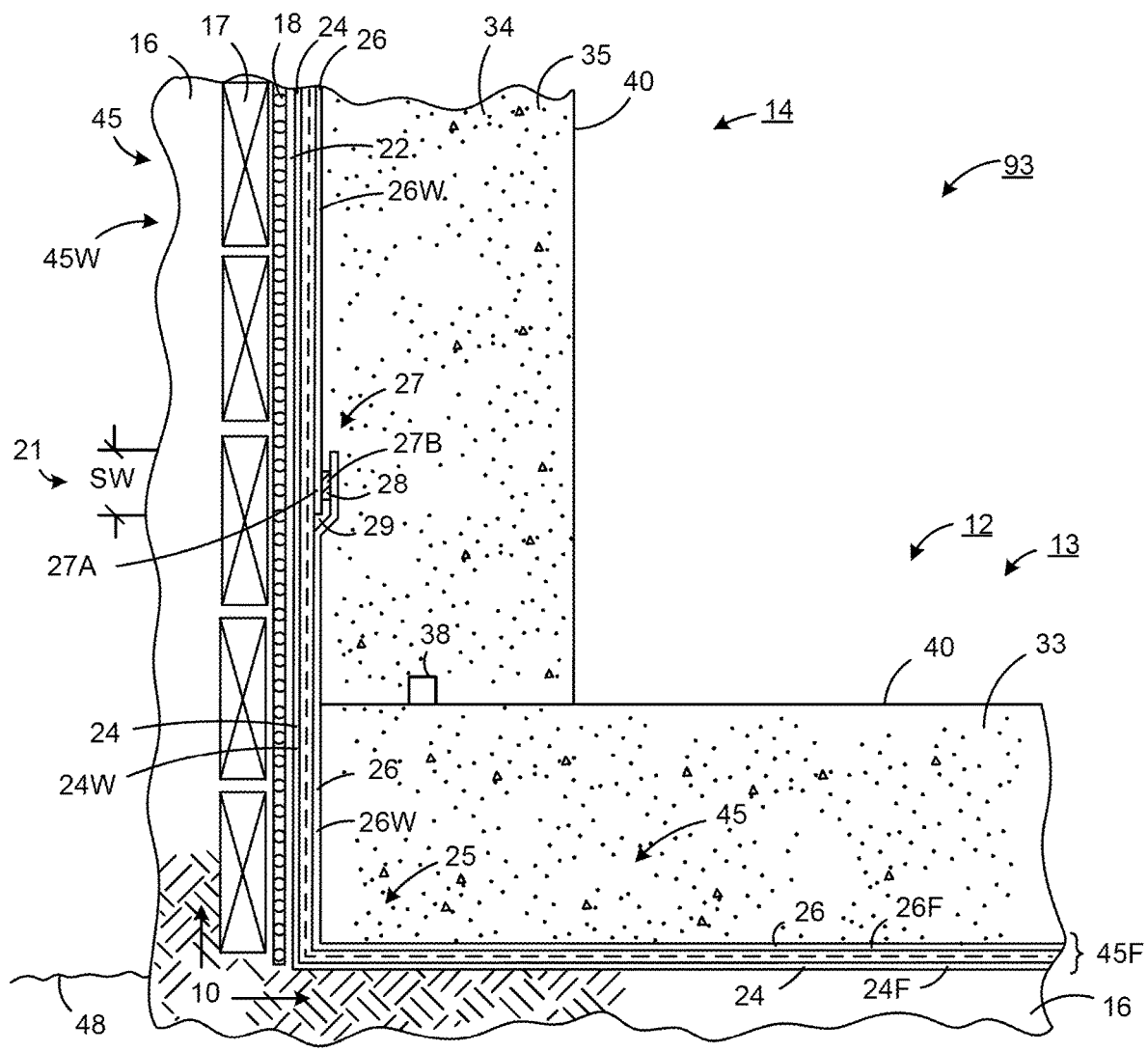
FIG. 13, illustrates a side cut-away view of the inventive below grade dual membrane waterproofing system for waterproofing according to a thirteenth embodiment of the invention.

FIG. 13, illustrates a side cut-away view of the inventive below grade dual membrane waterproofing system for waterproofing 93, according to a thirteenth embodiment of the invention. FIG. 13, is similar to FIG. 1, except that the dual inventive layer assembly 45, fully extends along the wall surface 14, creating a dual inventive wall layer assembly 45W, and it also fully extends along the floor surface 12, 13, creating a dual inventive floor layer assembly 45F, and the combination of 45W, and 45F, is used as a water or moisture protection layer 45, or as a waterproofing layer 45, against the water table 48, or hydrostatic pressure 48. Furthermore, FIG. 13, also shows that for some applications or areas, one may not need a drain board or foam 18, while in other areas, a drain board or foam 18, may be needed or desired by a user, or as needed in a specific application. Thus, as one can appreciate that the dual inventive wall layer assembly 45W, comprises of at least one layer of the membrane 24, or at least one layer of a wall membrane 24W, that fully extends along the wall 14, and at least one skin layer 26, or at least one layer of a wall skin layer 26W, that fully extends along the wall 14. Similarly, the dual inventive floor layer assembly 45F, comprises of at least one layer of the membrane 24, or at least one layer of a floor membrane 24F, that extends along the floor 12, 13, and at least one skin layer 26, or at least one layer of a floor skin layer 26F, that extends along the floor 12, 13. For most applications it is preferred that the dual inventive wall layer assembly 45W, transitions into the dual inventive wall layer assembly 45F, at or around the corner 25, without a seam, such as, seam 29. For some applications it is preferred that the seam 29, has a seam width 21, or seam width SW, and wherein the seam width 21, is sufficiently wide to provide a waterproof seam 29. It is preferred for most applications that the seam width 21, is at least, say about 3 inches or more, or as desired by the user, or as needed for the application. Even though seam 29, provides a complete waterproof seam or joint 29, but in reality it does provide a weak spot, as it is done by hand by workers, and not some precise calibrated equipment or machine. It should be appreciated that the seam 29, is only shown for the at least one skin layer 26, but in reality, the at least one layer of the membrane 24, also has seam 29, but for the ease of understanding it is not being shown. However, it should be understood that the seam 29, for the at least one layer of the membrane 24, is similar to the seam 29, for the at least one skin layer 26, and uses the same materials, and processes to create the seam 29, for the at least one layer of the membrane 24. Furthermore, it should be understood that FIG. 13, clearly shows that the inventive dual layer 45, comprising of the inventive wall portion dual layer 45W, and the inventive floor portion dual layer 45F, extends along the complete wall 14, and along the complete or entire floor surface 12, 13.

It should be appreciated that the at least one primary membrane 26, or skin 26, (such as, Aussie Skin 550), is a heavy duty sheet membrane 26, with adhesive 26A, to fully bond to concrete/shotcrete 33, 35, however, it can be any sheet membrane 26, with adhesive 26A, to fully bond to concrete/shotcrete 33, and having any thickness. It is preferred that the primary membrane 26, with adhesive 26A, to fully bond to concrete/shotcrete 33, 35, should be easy to install, should be a puncture resistant sheet waterproofing membrane 26, and having an excellent adhesion 26A, between the secondary membrane 24, and a wet concrete 33, 35, or shotcrete 33, 35.

Shotcrete 33, 35, or sprayed concrete 33, 35, is concrete 33, 35, or mortar 33, 35, conveyed through a hose (not shown) and pneumatically projected at high velocity onto a surface 13, 14, as a construction technique. For some applications the sprayed concrete 33, 35, or shotcrete 33, 35, is typically reinforced by conventional steel rods, steel mesh, or fibers, such as, for example, a rebar cage 58. Shotcrete 33, 35, can be placed, and compacted at the same time, due to the force with the nozzle, and it can be sprayed onto any type or shape of surface 13, 14, including vertical surface 14, horizontal surface 13, or overhead areas (not shown), such as, along a roof or ceiling.

The secondary membrane 24, thickness, and appropriate protection, and drainage, will depend on the particular application, and one can get this information, from the provider of the waterproofing system, (such as, for example, the AVM System 500/502 technical drawings and documentation), as these criteria or specification will depend on the soil type and condition 10, the water or moisture table 48, and the specifications of the building 34.

It is preferred that all securing means 50, 60, such as, for example, anchors, nails, screws, etc., that are used to hang or apply the plastic liner 22, and/or the dual membrane 45, below the water table 48, be non-rusting or rust-proof securing means 50, 60, and all screws 50, 60, (FIGS. 8, and 10), used to hang the skin membrane 26, are preferably sealed with, for example, a 3 inch×3 inch patch of material 26, 65, (such as, for example, Aussie Skin), bonded with, for example, double-sided tape 28, 64, (such as, for example, Aussie tape), as the patch of material 26, 65, would provide the waterproofing qualities.

For some applications, such as, below the water table 48, a drain board 18, may be substituted with an approved protection layer 18, as long as the approved protection layer 18, is providing sufficient protection for the dual membrane system 45, installed on the building 34.

As stated earlier that this invention 23, 43, can be used, such as, for example, especially in a high risk conditions, where, for example, the building 34, or floor 12, or wall 14, or structure 12, 14, is going to be built in a water table 48, area and/or exposed to periodic or on-going hydrostatic pressure 48. One of the innovations of this invention 23, 43, is that it includes, at least one plastic liner 22, or the polyolefin layer 22, at least one layer of secondary membrane 24, such as, for example, liquid bitumen 24, which when cured becomes a solid sheet 24, or layer membrane 24. After the sprayed liquid membrane 24, material has cured, or a sheet membrane 24, has been installed, then the at least one layer of the primary membrane 26, or skin layer 26, (such as, for example, Aussie Skin membrane), is installed over the exposed face or surface of the first membrane material layer 24, or secondary membrane 24.

It has been observed that when one shoots shotcrete 33, 35, on an extremely poor quality wall 14, or surface 13, 14, since the concrete 33, 35, is coming out at high volume, and at high speed out of the nozzle (not shown), it can rupture the membrane 24, by pushing portions of the membrane 24, into the voids 16B, cracks 16B, etc., in the wall 14, or surface 13. However, this invention 23, 43, overcomes this problem of potential membrane 24, rupture, as a polyolefin plastic liner 22, which has very strong burst resistance properties, is first installed or hung, along the wall 14, or surface 13. It is preferred that the average thickness of the polyolefin plastic liner 22, be between, for example, about 2 mil to about 30 mil, and preferably between about 10 mil, to about 20 mil, and preferably, about 16 mil. On this at least one layer of polyolefin plastic liner 22, it is preferred that at least one layer of between about 10 mil to 100 mil, and preferably, between about 40 mil to about 80 mil, and preferably about 60 mils thick bituminous membrane 24, or a secondary membrane 24, is applied, such as, by spraying liquid bitumen 24, or asphalt 24, and then a primary membrane 26, or a sheet-based membrane 26, is installed so as to create the dual membrane layer or assembly 45.

It has been observed that the inventive dual membrane assembly 45, which comprises of at least one polyolefin plastic layer 22, or similar plastic layer 22, with at least one spray coating or layer of the bituminous material 24, or secondary membrane 24, bonded, and secured to it, serves several functions.

1. It acts as a cushion to help absorb the impact of the shotcrete 33, 35, when it is shot onto the walls 14, or floor 13.

2. Additionally, the dual layer system 45, of this invention 23, 43, along with the plastic liner 22, or polyolefin layer 22, acts as a gasket in case of a puncture which will self-seal many small holes and ruptures, as the properties of each material 22, 24, 26, is different than the other, but together they provide synergy.

The plastic sheet or layer 22, and the membrane 24, (such as, for example, the Aussie membranes 500 or 502), forms the secondary membrane 24, and over it at least one layer of the primary membrane 26, or skin 26, (such as, for example, Aussie Skin 550), is installed or secured to it. The skin 26, is preferably very thick, such as, for example, about 1.2 mm thick. The at least one secondary membrane layer 24, (such as, for example, the Aussie Membrane 500/502), preferably has a thickness ranging from between about 20 mils, to about 240 mils.

For some applications one could also use a high-density polyethylene (HDPE) sheet skin membrane 26, (such as, for example, Aussie Skin 550), having different thicknesses, depending on the job requirements, and ranging, for example, from about 0.5 mm to about 2.5 mm thick, that can be secured to the exposed face or surface of the membrane 24, to form the dual membrane assembly 45.

For areas where one skin sheet or layer 26, is being joined to another skin sheet or layer 26, such as, at a seam 29, it is preferred that the area 29, that is going to be overlapped 27, has clean surfaces. Before bonding the next skin layer 26, to an existing or already applied skin layer 26, one should remove the release film(s) (not shown) from the factory laps of the skin layer 26, which release film(s) is used to protect the adhesive layer 26A, as that surface of the adhesive layer 26A, does not have the bonding material 26B, adhered thereto. It is preferred the next or second skin sheet or barrier layer 26, be installed and mated with the previous or already installed skin sheet or layer 26, and has, for example, a minimum of say, between about 2.0 inches to about 6.0 inches overlap 27, around the seam 29, or edges 27A, 27B. For some applications it is preferred that a steel or rubber roller, is rolled or passed over the overlap 27, or the seam joint area 29, several times while applying pressure to ensure proper adhesion between the first edge 27A, of the first skin sheet or layer 26, and the second edge 27B, of the second skin sheet or layer 26, that is being joined, each to the other, at their respective edges 27A, 27B. For some applications, such as, for example, during cold or wet weather where one skin layer or sheet 26, for some reason is not adhering to the second skin layer or sheet 26, one could optionally, and gently use a heat gun, or a welder (such as, a Liester welder), which will help improve the adhesion between the two overlapping skin layers 26, at the seam 29, and along the overlap 27, and edges 27A, 27B.

For the inventive dual layer system 45, applications according to this invention 23, 43, one would have at least one layer of a plastic liner 22, such as, for example, a 10 mil high-density polyethylene (HDPE) 22, or polyethylene high-density (PEHD) 22, which is a polyethylene thermoplastic made from petroleum, liner 22, and a secondary membrane 24, such as a liquid sprayed coating of at least one layer of a membrane 24, such as, for example, but not limited to bitumen 24, or asphalt 24, or Gel 24 or Polyurethane 24, or hot or cold liquid rubber 24, material, to name a few. Or, alternately, the secondary membrane 24, may be a sheet-based membrane 24, such as for example, but not limited to a bituminous sheet waterproofing membrane 24, asphaltic sheet waterproofing membrane 24, polyurethane sheet waterproofing membrane 24, so as to form a single dual layer 45, comprising of both the primary membrane 26, and the secondary membrane 24.

Thus, the present invention is not limited to the embodiments described herein and the constituent elements of the invention can be modified in various manners without departing from the spirit and scope of the invention. Various aspects of the invention can also be extracted from any appropriate combination of a plurality of constituent elements disclosed in the embodiments. Some constituent elements may be deleted in all of the constituent elements disclosed in the embodiments. The constituent elements described in different embodiments may be combined arbitrarily.

Still further, while certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions.

It should be further understood that throughout the specification and claims several terms have been used and they take the meanings explicitly associated herein, unless the context clearly dictates otherwise. For example, the phrase "in one embodiment" as used herein does not necessarily refer to the same embodiment, though it may. Additionally, the phrase "in another embodiment" as used herein does not necessarily refer to a different embodiment, although it may. Thus, various embodiments of the invention may be readily combined, without departing from the scope or spirit of the invention.

While the present invention has been particularly described in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

What is claimed is:

1. A dual waterproofing membrane assembly system for a structure, comprising:
    (a) at least one soil retention system having a first face and a second face, and wherein said first face faces compacted earth or soil;
    (b) at least one first waterproof membrane having a first face and a second face, and wherein at least a portion of said first face of said at least one first waterproof membrane is secured to at least a portion of said second face of said at least one soil retention system, and said at least one first waterproof membrane is composed of a layer of a first material;
    (c) at least one second waterproof membrane having a first face and a second face, said at least one second waterproof membrane defining at least one waterproof skin membrane composed of a layer of a second material, and wherein at least a portion of said first face of said at least one waterproof skin membrane is secured to at least a portion of said second face of said at least one first waterproof membrane;
    (d) at least one layer of one of concrete and shotcrete having a first face and a second face, and wherein at least a portion of said first face of said at least one layer of one of concrete and shotcrete is secured to at least a portion of said second face of said at least one waterproof skin membrane, so as to form said waterproofing membrane assembly system for said structure;
    (e) wherein the first material is different than the second material;
    (f) wherein said at least one first waterproof membrane, and said at least one second waterproof membrane forming a dual waterproofing layer extends along a wall; and
    (g) wherein one of said at least one first waterproof membrane, and said at least one second waterproof membrane extends along at least a portion of a floor.

2. The waterproofing membrane assembly system for a structure of claim 1, wherein said structure is selected from a group consisting of a foundation, a blind wall, an interior wall, an exterior wall, a foundation slab, and combinations thereof.

3. The waterproofing membrane assembly system for a structure of claim 1, wherein said at least one soil retention system is selected from a group consisting of a drain board, a foam, a compacted earth layer, a metallic structure, a wooden structure, a plastic structure, a composite structure, and combinations thereof.

4. The waterproofing membrane assembly system for a structure of claim 1, wherein said at least one first waterproof membrane is one of a liquid membrane which become a solid membrane upon curing, and a solid membrane.

5. The waterproofing membrane assembly system for a structure of claim 1, wherein at least one patch is securely applied between said at least one waterproof skin membrane so as to extend one of a length and a width of said at least one waterproof skin membrane.

6. The waterproofing membrane assembly system for a structure of claim 1, wherein said at least one first waterproof membrane consists of at least one material selected from a group consisting of bitumen material, rubber material, polyurethane material, asphalt material, gel material, bituminous material, asphaltic material, and combinations thereof.

7. The waterproofing membrane assembly system for a structure of claim 1, wherein said at least one waterproof skin membrane further consists of at least one material selected from a group consisting of an adhesive material, a sand material, a mineral material, a coating material, a composite material, a sheet material, a bonding material, and combinations thereof.

8. The waterproofing membrane assembly system for a structure of claim 1, wherein the thickness of said at least one first waterproof membrane is between about 20 mil to about 240 mil.

9. The waterproofing membrane assembly system for a structure of claim 1, wherein the thickness of said at least one waterproof skin membrane is between about 0.5 mm to about 2.5 mm.

10. The waterproofing membrane assembly system for a structure of claim 1, wherein at least one securing means is used to secure one of said at least one first waterproof membrane and said at least one waterproof skin membrane to at least a portion of said at least one soil retention system.

11. The waterproofing membrane assembly system for a structure of claim 1, wherein at least one securing means is used to secure one of said at least one first waterproof membrane and said at least one waterproof skin membrane to at least a portion of said at least one soil retention system, and wherein said at least one securing means is selected from a group consisting of an anchor, a screw, a nail, an adhesive, a bolt, and combinations thereof.

12. The waterproofing membrane assembly system for a structure of claim 1, wherein at least one securing means having a shaft is used to secure one of said at least one first waterproof membrane and said at least one waterproof skin membrane to at least a portion of said at least one soil retention system, and wherein at least one sealant surrounds at least a portion of said shaft.

13. The waterproofing membrane assembly system for a structure of claim 1, wherein at least one securing means is used to secure one of said at least one first waterproof membrane and said at least one waterproof skin membrane to at least a portion of said at least one soil retention system, and wherein at least one patch covers at least a portion of said at least one securing means.

14. The waterproofing membrane assembly system for a structure of claim 1, wherein at least one liner having a first face and a second face, is placed between said at least one soil retention system and said at least one first waterproof membrane, such that at least a portion of said first face of said at least one liner is secured to at least a portion of said second face of said at least one soil retention system, and at least a portion of said second face of said at least one liner is secured to at least a portion of said first face of said at least one first waterproof membrane.

15. The waterproofing membrane assembly system for a structure of claim 14, wherein said at least one liner is selected from a group consisting of a plastic liner, a polyolefin liner, a fabric liner, a single fabric liner, a dual fabric liner, a high-density polyethylene (HDPE) liner, a polyethylene high-density (PEHD) liner, a polyethylene thermoplastic liner, and combinations thereof.

16. A dual waterproofing membrane assembly system for a structure, comprising:
   (a) at least one soil retention system having a first face and a second face, and wherein said first face faces compacted earth or soil;
   (b) at least one liner having a first face and a second face, and wherein at least a portion of said first face of said at least one liner is secured to at least a portion of said second face of said at least one soil retention system;
   (c) at least one first waterproof membrane having a first face and a second face, and wherein at least a portion of said first face of said at least one first waterproof membrane is secured to at least a portion of said second face of said at least one liner, and said at least one first waterproof membrane is composed of a layer of a first material;
   (d) at least one second waterproof membrane having a first face and a second face, said at least one second waterproof membrane defining at least one waterproof skin membrane composed of a layer of a second material, and wherein at least a portion of said first face of said at least one waterproof skin membrane is secured to at least a portion of said second face of said at least one first waterproof membrane;
   (e) at least one layer of one of concrete and shotcrete having a first face and a second face, and wherein at least a portion of said first face of said at least one layer of one of concrete and shotcrete is secured to at least a portion of said second face of said at least one waterproof skin membrane, so as to form a dual waterproofing membrane assembly system for said structure;
   (f) wherein the first material is different than the second material;
   (g) wherein said at least one first waterproof membrane, and said at least one second waterproof membrane forming a dual waterproofing layer extends along a wall; and
   (h) wherein one of said at least one first waterproof membrane, and said at least one second waterproof membrane extends along at least a portion of a floor.

17. The waterproofing membrane assembly system for a structure of claim 16, wherein said structure is selected from a group consisting of a foundation, a blind wall, an interior wall, an exterior wall, a foundation slab, and combinations thereof.

18. A method of providing a dual waterproofing membrane assembly system for a structure, comprising the steps of:
   (a) forming at least one soil retention system having a first face and a second face, and wherein said first face faces compacted earth or soil;
   (b) securing at least one first waterproof membrane having a first face and a second face to at least a portion of said at least one soil retention system, such that said first face of said at least one first waterproof membrane is secured to at least a portion of said second face of said at least one soil retention system, and said at least one first waterproof membrane is composed of a layer of a first material;
   (c) securing at least one second waterproof membrane having a first face and a second face, said at least one second waterproof membrane defining at least one waterproof skin membrane composed of a layer of a second material, to at least a portion of said at least one first waterproof membrane, such that said first face of said at least one waterproof skin membrane is secured to at least a portion of said second face of said at least one first waterproof membrane;
   (d) securing at least one layer of one of concrete and shotcrete having a first face and a second face to at least a portion of said second face of said at least one waterproof skin membrane, so as to form a dual waterproofing membrane assembly system for said structure;
   (e) wherein the first material is different than the second material;
   (f) wherein said at least one first waterproof membrane, and said at least one second waterproof membrane forming a dual waterproofing layer extends along a wall; and
   (g) wherein one of said at least one first waterproof membrane, and said at least one second waterproof membrane extends along at least a portion of a floor.

19. The method of providing a waterproofing membrane assembly system for a structure of claim 18, wherein said structure is selected from a group consisting of a foundation, a blind wall, an interior wall, an exterior wall, a foundation slab, and combinations thereof.

20. The method of providing a waterproofing membrane assembly system for a structure of claim 18, wherein said at least one first waterproof membrane consists of at least one material selected from a group consisting of bitumen material, rubber material, polyurethane material, asphalt material, gel material, bituminous material, asphaltic material, and combinations thereof.

21. The method of providing a waterproofing membrane assembly system for a structure of claim 18, wherein said at least one waterproof skin membrane further consists of at least one material selected from a group consisting of an adhesive material, a sand material, a mineral material, a coating material, a composite material, a sheet material, a bonding material, and combinations thereof.

* * * * *